US012657094B2

(12) United States Patent
Krivenok et al.

(10) Patent No.: US 12,657,094 B2
(45) Date of Patent: Jun. 16, 2026

(54) RECOVERING DATA IN CLOUD-BASED STORAGE ENVIRONMENTS

(71) Applicant: Dell Products L.P., Round Rock, TX (US)

(72) Inventors: Dmitry Vladimirovich Krivenok, Dublin (IE); Yifan Ivan Wang, Shanghai (CN); Tristan Wang, Shanghai (CN); Yong Wang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/812,329

(22) Filed: Aug. 22, 2024

(65) Prior Publication Data

US 2026/0056848 A1     Feb. 26, 2026

(51) Int. Cl.
*G06F 11/14* (2026.01)
*G06F 11/1446* (2026.01)

(52) U.S. Cl.
CPC ...... *G06F 11/1469* (2013.01); *G06F 11/1435* (2013.01); *G06F 11/1464* (2013.01)

(58) Field of Classification Search
CPC .. G06F 11/14; G06F 11/1469; G06F 11/1435; G06F 11/1464
See application file for complete search history.

(56) References Cited

U.S. PATENT DOCUMENTS

| | | | |
|---|---|---|---|
| 11,416,450 B1 * | 8/2022 | Du | H04L 9/0894 |
| 11,755,432 B2 * | 9/2023 | Krishnan | G06F 11/2041 |
| | | | 714/4.11 |
| 11,966,306 B1 * | 4/2024 | McGarry | G06F 11/3006 |
| 12,001,876 B2 * | 6/2024 | Shemer | G06F 9/45558 |
| 2021/0218807 A1 | 7/2021 | Saad et al. | |
| 2022/0224542 A1 | 7/2022 | Sharma et al. | |
| 2023/0128370 A1 | 4/2023 | Shemer et al. | |
| 2024/0272989 A1 * | 8/2024 | Sharma | G06F 11/2023 |
| 2025/0071012 A1 * | 2/2025 | Yousouf | H04L 43/0817 |
| 2025/0071014 A1 * | 2/2025 | Yousouf | H04L 41/0668 |
| 2025/0071015 A1 * | 2/2025 | Yousouf | H04L 41/0668 |
| 2025/0208781 A1 * | 6/2025 | Aharoni | G06F 3/0617 |

* cited by examiner

*Primary Examiner* — Kamini B Patel

(74) *Attorney, Agent, or Firm* — BainwoodHuang

(57) ABSTRACT

A technique for recovering data following a failure of a first availability zone (AZ) of a cloud-based system includes creating a plurality of temporary instances in a second AZ of the cloud-based system. The technique further includes copying, by the plurality of temporary instances, recovery data from multiple cloud-based snapshots to a plurality of local volumes of the second AZ such that the temporary instances of the plurality of temporary instances copy respective portions of the recovery data in parallel. The technique still further attaching the plurality of local volumes to a storage-controller instance running in the second AZ.

20 Claims, 6 Drawing Sheets

400

402 — Pull specs of instance types

404 — Disqualify instance types with insufficient specs

406 — Form a combination of instances

408 — Does the combination have sufficient capabilities?

Yes

No

410 — Add to candidate combinations

412 — Disqualify combination

414 — Have all combinations been considered?

No

Yes

416 — Rank candidate combinations

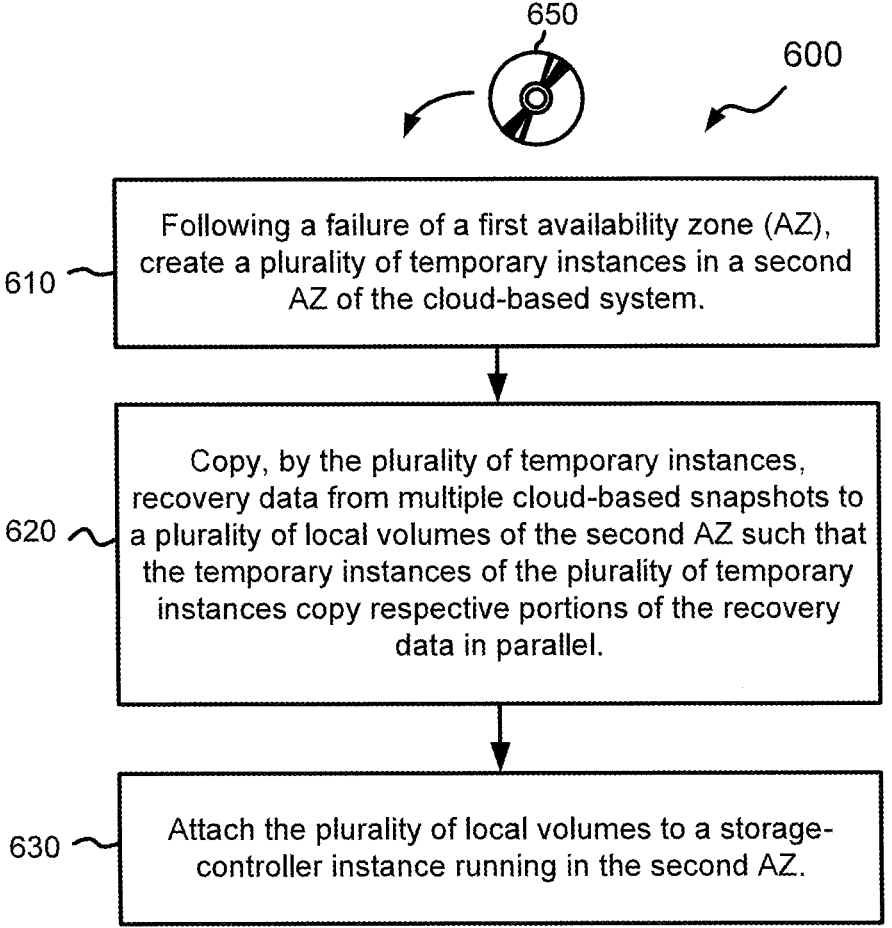

650

600

610 — Following a failure of a first availability zone (AZ), create a plurality of temporary instances in a second AZ of the cloud-based system.

620 — Copy, by the plurality of temporary instances, recovery data from multiple cloud-based snapshots to a plurality of local volumes of the second AZ such that the temporary instances of the plurality of temporary instances copy respective portions of the recovery data in parallel.

630 — Attach the plurality of local volumes to a storage-controller instance running in the second AZ.

FIG. 6

RECOVERING DATA IN CLOUD-BASED STORAGE ENVIRONMENTS

BACKGROUND

Cloud providers host data services by providing access to data centers in a cloud. One or more data centers in a common geographical region constitute an availability zone (AZ) from which the data services may be hosted. For example, a storage appliance may run on a virtual storage controller on one or more physical servers in the same AZ in the cloud. Customers can access the storage appliance using their local machines over a network, such as the Internet. The storage appliance is arranged to access stored data from volumes, which are local to the AZ but are also backed up in the cloud outside the AZ using snapshots.

AZs sometimes become unavailable, e.g., due to hardware failures, software errors, malware, and the like. When an AZ becomes unavailable due to a failure, one approach for recovering from the failure is to instantiate a new virtual storage controller in a different, still-functioning AZ in the cloud and to attach new volumes to the new AZ for storing data originally found in the volumes of the now-failed AZ. The new virtual storage controller may then recover the data of the original volumes by copying the data from the snapshots to the new volumes.

SUMMARY

Unfortunately, data recovery into new volumes from cloud snapshots can be slow. Any read of data not previously copied to the new volumes involves a read from a cloud snapshot, which results in long latency. In some cases, long latency causes timeouts or a failure to meet performance levels specified by service level agreements.

One option for addressing long latency during recovery is to perform a full read of all data from the cloud snapshots into the new volumes. Completing the full read provides fast, local access to data in the new volumes, but the full read itself can require considerable time and can necessitate an extended period of slow data access or data unavailability. To make matters worse, some cloud provides impose bandwidth limits on cloud instances, such as those that implement a new virtual storage controller, meaning that the full read cannot proceed faster than the bandwidth limit allows. What is needed, therefore, is a faster way of recovering from an AZ failure.

The above need is addressed at least in part by an improved technique that recovers data following a failure in an AZ by creating multiple temporary instances and directing those instances to populate local volumes with recovery data from cloud snapshots in parallel. Once the temporary instances have copied the recovery data to the local volumes, a storage-controller instance is provided and the local volumes are attached to it. Access to the data can then proceed from the local volumes via the new storage-controller instance.

Advantageously, the improved technique leverages multiple instances to quickly perform initial reads of data from snapshots into local volumes, effectively multiplying the available bandwidth beyond that of a single storage-controller instance. As a result, the technique reduces an amount of time needed to fully recover from an AZ crash.

Certain embodiments are directed to a method of recovering data following a failure of a first availability zone (AZ) of a cloud-based system. The method includes creating a plurality of temporary instances in a second AZ of the cloud-based system. The method further includes copying, by the plurality of temporary instances, recovery data from multiple cloud-based snapshots to a plurality of local volumes of the second AZ such that the temporary instances of the plurality of temporary instances copy respective portions of the recovery data in parallel. The method still further includes attaching the plurality of local volumes to a storage-controller instance running in the second AZ.

In some embodiments, the method further includes, prior to creating a plurality of temporary instances, identifying multiple candidate combinations of instances that are available in the second AZ. One of the identified candidate combinations is the plurality of temporary instances. The method further includes selecting, from the candidate combinations, the plurality of temporary instances as a selected combination.

In some embodiments, selecting the plurality of temporary instances is based at least in part on a set of hardware capabilities of the temporary instances in the selected combination.

In some embodiments, identifying the candidate combinations includes disqualifying a particular combination of instances from the candidate combinations based on a sum of maximum allowable throughputs of instances in the particular combination being less than a sum of estimated maximum initial-access throughputs of the plurality of local volumes.

In some embodiments, identifying the candidate combinations includes disqualifying an instance type based on the instance type providing insufficient memory to copy a portion of recovery data from a snapshot of the multiple cloud-based snapshots into a local volume of the plurality of local volumes.

In some embodiments, identifying the candidate combinations includes disqualifying a particular instance type based on the particular instance type having a maximum throughput less than an estimated maximum throughput of one of the plurality of local volumes on an initial access.

In some embodiments, identifying the candidate combinations includes disqualifying a particular combination of instances from the candidate combinations based on the particular combination having a respective number of instances in which the plurality of local volumes is not evenly distributable.

In some embodiments, identifying the candidate combinations includes providing, as the candidate combinations, only uniform combinations of single types of instances.

In some embodiments, the method further includes, after selecting the plurality of temporary instances, confirming that the plurality of temporary instances is immediately available.

In some embodiments, the method further includes storing a list of the candidate combinations outside of the first AZ prior to the failure occurring in the first AZ. The method further includes reidentifying the candidate combinations at a predetermined interval to update the list of the candidate combinations.

In some embodiments, the method further includes provisioning the storage-controller instance with a lower maximum allowable throughput than a sum of maximum allowable throughputs of the plurality of temporary instances.

In some embodiments, estimating a maximum initial-access throughput of a local volume of the plurality of local volumes. The estimated maximum initial-access throughput indicates an estimated maximum throughput of the local volume when the local volume is first brought online. The method further includes, prior to copying recovery data from a cloud-based snapshot to the local volume, provisioning the local volume with a maximum allowable throughput based on the estimated maximum initial-access throughput.

In some embodiments, the method further includes, after copying the data from the snapshot section to the local volume, reprovisioning the maximum allowable throughput of the local volume to increase the maximum allowable throughput.

In some embodiments, the method further includes, while copying the recovery data, detecting an unavailability of a temporary instance of the plurality of temporary instances. One or more local volumes of the plurality of local volumes are attached to the temporary instance. The method further includes, in response to detecting the unavailability of a temporary instance, attaching the one or more local volumes to another temporary instance in the second AZ. The method still further includes copying, by the other temporary instance, a remaining portion of the recovery data to the one or more local volumes.

In some embodiments, the method further includes, prior to detecting the unavailability of the temporary instance, generating progress metadata that tracks a progress of copying the recovery data by the temporary instance. Further, copying, by the other temporary instance, the remaining portion of the recovery data includes accessing the progress metadata to identify the remaining portion of the recovery data to copy.

Other embodiments are directed to a computerized apparatus constructed and arranged to perform a method of recovering data following a failure of a first AZ of a cloud-based system, such as the method described above. Still other embodiments are directed to a computer program product. The computer program product stores instructions which, when executed on control circuitry of a computerized apparatus, cause the computerized apparatus to perform a method of recovering data following a failure of a first AZ of a cloud-based system, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL
VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

FIG. 6 is a flowchart showing an example method of recovering data following a failure of a first AZ of a cloud-based system.

DETAILED DESCRIPTION

Embodiments of the improved technique will now be described. One should appreciate that such embodiments are provided by way of example to illustrate certain features and principles but are not intended to be limiting.

An improved technique recovers data following a failure in an availability zone (AZ) by creating multiple temporary instances and directing those instances to copy recovery data from cloud snapshots in parallel into local volumes. Once the temporary instances have copied the recovery data to the local volumes, the local volumes are attached to a storage-controller instance. Access to the data can then proceed from the local volumes via the new storage-controller instance.

Figure 1:
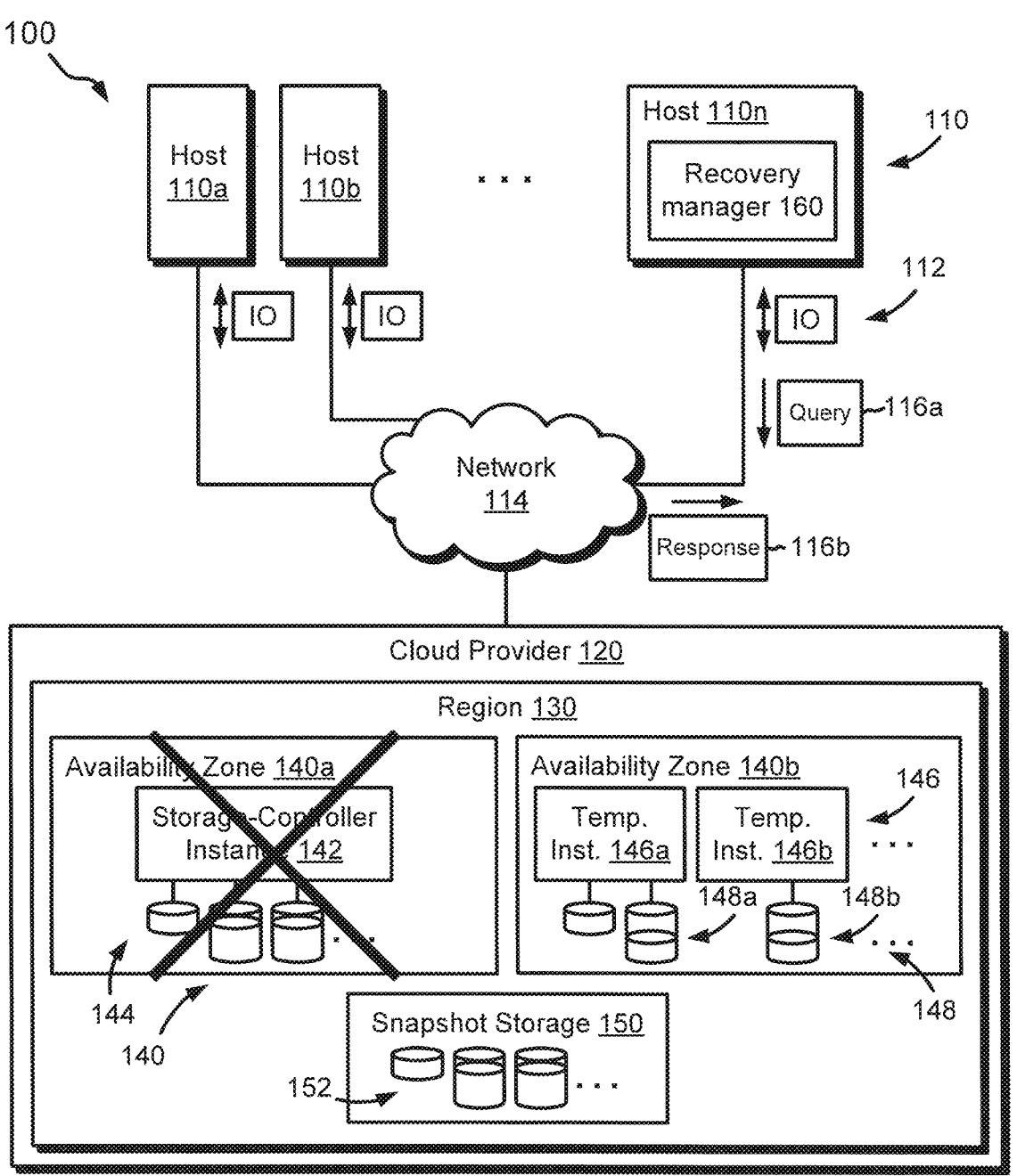
FIG. 1 is a block diagram of an example environment in which embodiments of the improved technique can be practiced.

FIG. 1 shows an example environment 100 in which embodiments of the improved technique can be practiced. Here, hosts 110 (e.g., host 110a, 110b, . . . 110n) are coupled over a network 114 to a cloud provider 120. The cloud provider 120 operates multiple AZs 140 (e.g., AZs 140a, 140b, and so forth) in a region 130. Further, the cloud provider maintains snapshots 152 in a snapshot storage facility 150 that is separate from the AZs 140, such as in a different geographical location.

The region 130 is a geographical area in which the AZs 140 are located. Although only one region is depicted in FIG. 1, it should be appreciated that a cloud provider 120 may maintain multiple regions, e.g., US East, US West, Europe, and so forth. Similarly, a region may support any number of AZs.

An AZ is typically a group of data centers constructed and arranged to provide remote data services to the hosts 110. Different AZs 140 are physically separated from each other such that a failure of one of the AZs 140 does not necessarily impact the operations of another.

Each of the AZs 140 is configured to run instances, which may be provided as virtual machines, virtual containers, or the like. Such instances may be allocated different amounts of memory, computational resources (e.g., CPUs, GPUs, etc.), and/or non-volatile storage (e.g., from disk drives, electronic flash drives, etc.). Different types of instances may provide different operating systems, versions, and/or allocation options, e.g., whether the instances are allocated as a reserved, on-demand, or spot instances. Although instances may be implemented as virtual machines or containers, for example, one should appreciate that each instance is supported by a respective amount of memory, processing power, and non-volatile storage, which may be accessed through a physical computing server. For example, the AZs 140 may have large numbers of physical computing servers (not shown) on which the instances run.

The network 114 may be any type of network or combination of networks, such as a local area network (LAN), a wide area network (WAN), the Internet, and/or some other type of network or combination of networks, for example. The hosts 110 may connect to the cloud provider 120 using various technologies, iSCSI (Internet small computer system interface), NFS (network file system), and CIFS (common Internet file system), for example. As is known, iSCSI is a block-based protocols, whereas NFS and CIFS are file-based protocols. The storage-controller instance 142 is configured to receive I/O requests 112 according to block-based and/or file-based protocols and to respond to such I/O requests 112 by reading or writing data in local volumes 144.

The snapshot storage facility 150 is constructed and arranged to store recovery data in the form of snapshots 152. Preferably, the snapshots 152 are cloud-based, instance-level snapshots that correspond one-to-one with the volumes 144. That is, the snapshots 152 are accessible by one or more of the AZs 140 in the cloud and provide a point-in-time copy of data in volumes attached to an instance, e.g., the volumes 144 attached to the storage-controller instance 142. Further, in some embodiments, the snapshots 152 are crash-consistent, meaning that the snapshots 152 omit uncommitted updates to the volumes 144 to maintain data consistency. In some embodiments, the snapshots 152 are organized together in a larger grouping, e.g., to distinguish snapshots from separate points in time.

The snapshot storage facility 150 is separate from the AZs 140 such that a failure of one or more of the AZs 140 does not affect the availability of the snapshot storage facility 150. In some embodiments, the snapshot storage facility 150 is region-level storage with high durability, but accessing data from region-level storage typically involves higher latency than accessing local storage from volumes in an AZ, which can be up to two orders of magnitude greater latency. As a result, in some embodiments, accessing region-level storage to service I/O requests 112 is unacceptably slow or even impossible, causing timeouts of the I/O requests 112 or failures to meet performance levels specified in service level agreements.

As further shown in FIG. 1, a recovery manager 160 runs on a host 110n coupled over the network 114 to the cloud provider 120. The recovery manager 160 is constructed and arranged to direct the cloud provider 120 to recover data from the snapshots 152 following a failure of a first AZ, e.g., the AZ 140a. Along these lines, the recovery manager is constructed and arranged to send various queries 116a to the cloud provider 120 and receive responses 116b from the cloud provider 120. The queries 116a and the responses 116b enable the recovery manager 160 to monitor statuses of the AZs 140 and the snapshots 152, to identify types of instances available in one or more of the AZs 140, and to track statuses of recovery operations, for example.

In the embodiment shown in FIG. 1, the recovery manager 160 runs on one of the hosts 110. However, it should be understood that the recovery manager 160 may run on more than one of the hosts 110 or may be maintained in the cloud.

In example operation, the storage-controller instance 142 in the AZ 140a originally provides data services to the hosts 110 before the AZ 140a fails. The recovery manager 160 detects the failure of the AZ 140a and, in response, identifies and designates a new AZ 140b as a target location for recovery. Further, the recovery manager 160 accesses the snapshots 152 to determine a plurality of local volumes 148 in which to copy recovery data and further determines a plurality of temporary instances 146 with which copy the recovery data. In some embodiments, the number of local volumes 148 is greater than the number of temporary instances 146. The recovery manager 160 then directs the cloud provider 120 to create the plurality of temporary instances 146 and the plurality of local volumes 148 in the new AZ 140b. In some embodiments, the volumes of the plurality of local volumes 148 correspond, one-to-one, with volumes of the plurality of volumes 144 from the failed AZ 140a. Other arrangements are possible, though.

Further, the recovery manager 160 directs the cloud provider 120 to attach the plurality of local volumes 148 to the plurality of temporary instances 146. Attaching a volume to a temporary instance allows the temporary instance to perform data storage operations with the volume, e.g., writing data to the volume or reading data from the volume. In some embodiments, the recovery manager 160 attaches one or more local volumes to each temporary instance, e.g., multiple local volumes 148a are attached to temporary instance 146a.

Still further, the recovery manager 160 directs the plurality of temporary instances 146 to copy recovery data from the snapshots 152 to the plurality of local volumes 148 such that the temporary instances of the plurality of temporary instances 146 copy respective portions of the recovery data in parallel. For example, the temporary instance 146a copies a portion of data to local volumes 148a, the temporary instance 146b copies a portion of recovery data to local volume 148b, and so forth. In this manner, the temporary instances 146 together recover the data originally stored in volumes 144 of the failed AZ 140a to the local volumes 148 of the new AZ 140b. Advantageously, performing the copying in parallel allows recovery operations to leverage input/output (I/O) throughputs of multiple instances simultaneously, providing an increased speed in recovery from an AZ failure compared to a single instance.

After copying the recovery data to the plurality of local volumes 148, the recovery manager 160 directs the cloud manager to attach the plurality of local volumes 148 to a storage-controller instance in the new AZ 140b, e.g., a similar instance as the storage-controller instance 142 originally provided in the failed AZ 140a. In this manner, normal storage operations may resume to service the I/O requests 112 from the new AZ 140b.

Figure 2A:
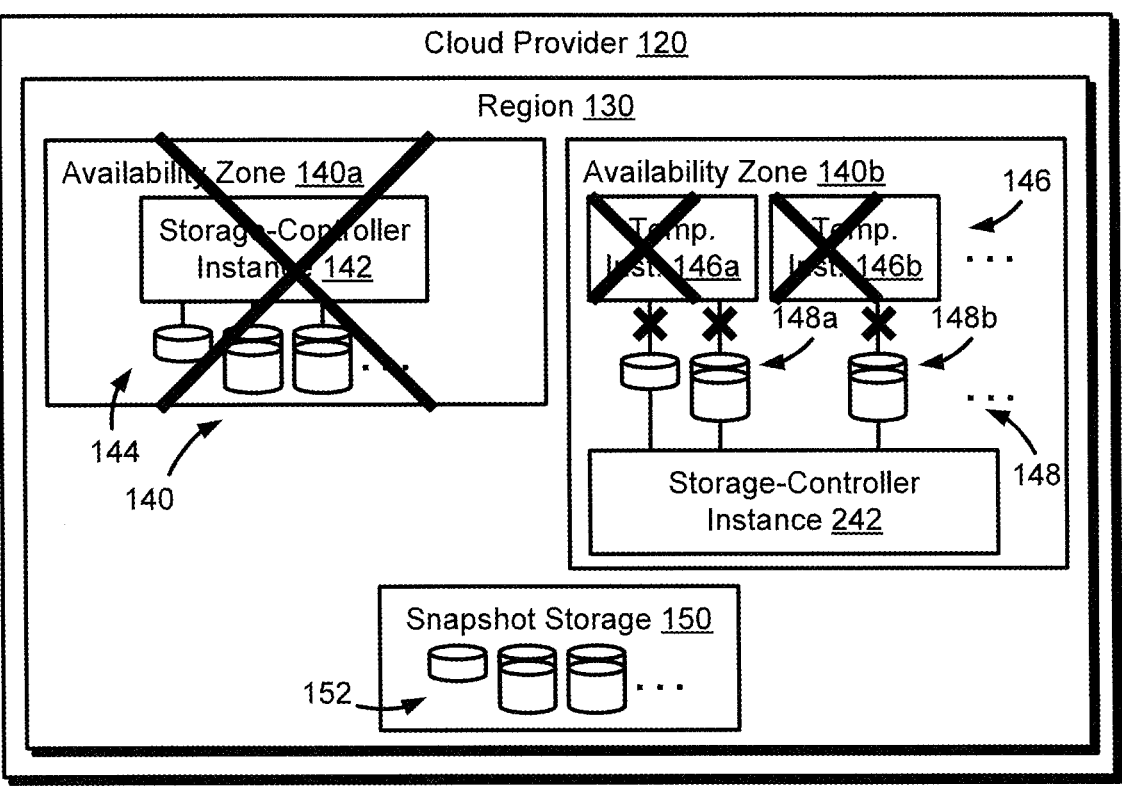
FIGS. 2a and 2b are block diagrams showing additional features of the example environment of FIG. 1 to provide access to data in an availability zone (AZ).
Figure 2B:
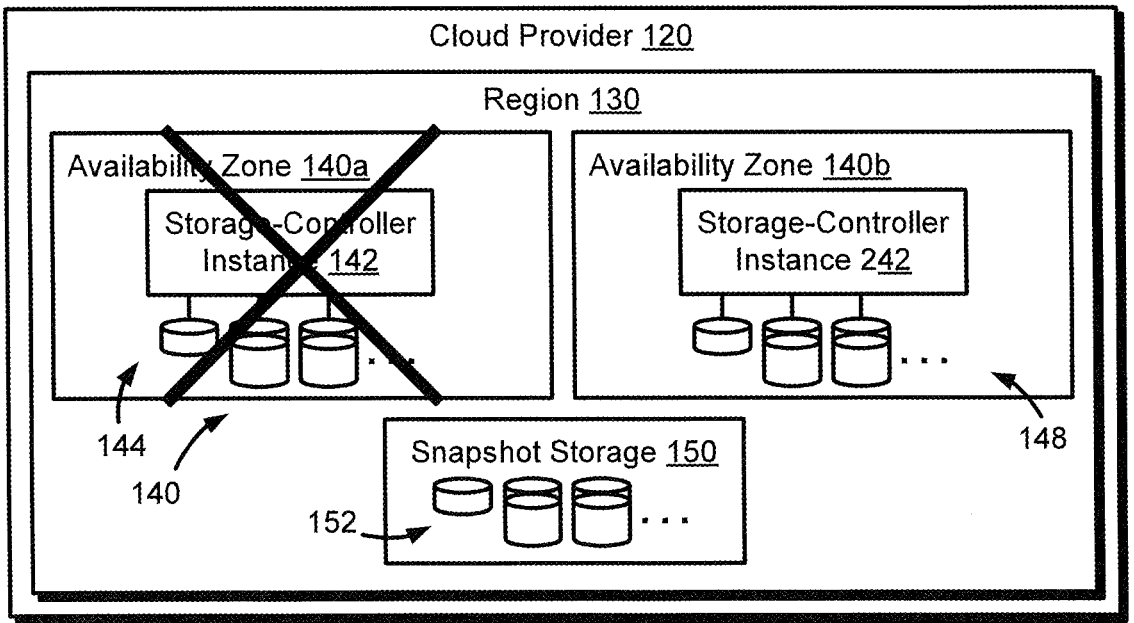

FIGS. 2a and 2b show additional features of the example environment 100. FIG. 2a, shows the plurality of local volumes 148 detached from the plurality of temporary instances 146 and attached to a new storage-controller instance 242 running in the new AZ 140b. FIG. 2b shows the AZ 140b after the temporary instances 146 have been terminated.

Preferably, the recovery manager 160 is constructed and arranged to direct the cloud manager 120 to create the storage-controller instance 242 after (or soon before) the temporary instances 146 finish copying the recovery data to the local volumes 148. In this manner, the plurality of local volumes 148 may be attached to the storage-controller instance 242 once the copying is complete.

The storage-controller instance 242 is configured to service the I/O requests 112 by reading or writing data in local volumes 148. In this manner, the storage-controller instance 242 performs similar functions as those originally assigned to the storage-controller instance 142 in the failed AZ 140a.

In some embodiments, the storage-controller instance 242 is provisioned with a lower maximum allowable throughput than a sum of maximum allowable throughputs of the plurality of temporary instances 146. That is, the plurality of temporary instances 146 provide a higher overall throughput to increase a speed at which a full read of recovery data into the local volumes 148 occurs. It should be appreciated that the higher throughput that the plurality of temporary instances 146 provides may not be necessary for normal storage operations, such as those the storage-controller instance 242 may perform.

Further, in addition to provisioned throughput limits of the temporary instances 146 and the storage-controller instance 242, the local volumes 148 have a separate throughput limit, referred to herein as a "maximum initial-access throughput." This maximum initial-access throughput refers to a maximum throughput of a local volume when the local volume is first brought online (created). In some embodiments, the maximum initial-access throughput is significantly lower than the local volume typically supports after an initial period of operation. As a result, in some embodiments, the maximum initial-access throughput restricts how quickly data can be written into the local volumes 148 during recovery. That is, a temporary instance is physically incapable of writing data faster than the maximum initial-access throughput of the local volume, even if the local volume and the temporary instance are both provisioned with higher throughputs. In some embodiments, the maximum initial-access throughput of a local volume is based on the type of volume and may be estimated, e.g., empirically.

Prior to copying recovery data from a cloud-based snapshot to a local volume, the recovery manager 160 directs the cloud provider 120 to provision the local volume with a maximum throughput based on an estimated maximum initial-access throughput of the local volume. For example, in some embodiments, the recovery manager 160 provisions the maximum throughput to be equal to the estimated maximum initial-access throughput. In this manner, a temporary instance is able to utilize a full breadth of the provisioned throughput when initially populating a local volume, without wasting resources.

At FIG. 2a, once the recovery manager 160 detects a completion of the full read of recovery data from the snapshots 152 into the local volumes 148, the recovery manager 160 directs the cloud provider 120 to detach the local volumes 148 from the temporary instances 146 and terminate the temporary instances 146. Further, the recovery manager 160 directs the cloud provider 120 to attach the local volumes 148 to the storage-controller instance 242. In this manner, regular storage operations may resume at FIG. 2b using the storage-controller instance 242.

In some embodiments, the storage-controller instance 242 is an instance that copies recovery data from the snapshots 152 in parallel with the temporary instances 146. In this case, any of the local volumes 148 attached to the storage-controller instance 242 remain attached, and the storage-controller instance 242 remains after the temporary instances 146 are terminated.

In some embodiments, after recovery to a local volume is complete, the recovery manager 160 directs the cloud provider 120 to reprovision the local volume with a higher maximum allowable throughput. It should be appreciated that, after initially accessing the local volume to write the recovery data, the local volume is no longer limited by its maximum initial-access throughput. As a result, in some embodiments, the maximum allowable throughput is increased to take advantage of higher throughput speeds.

Figure 3:
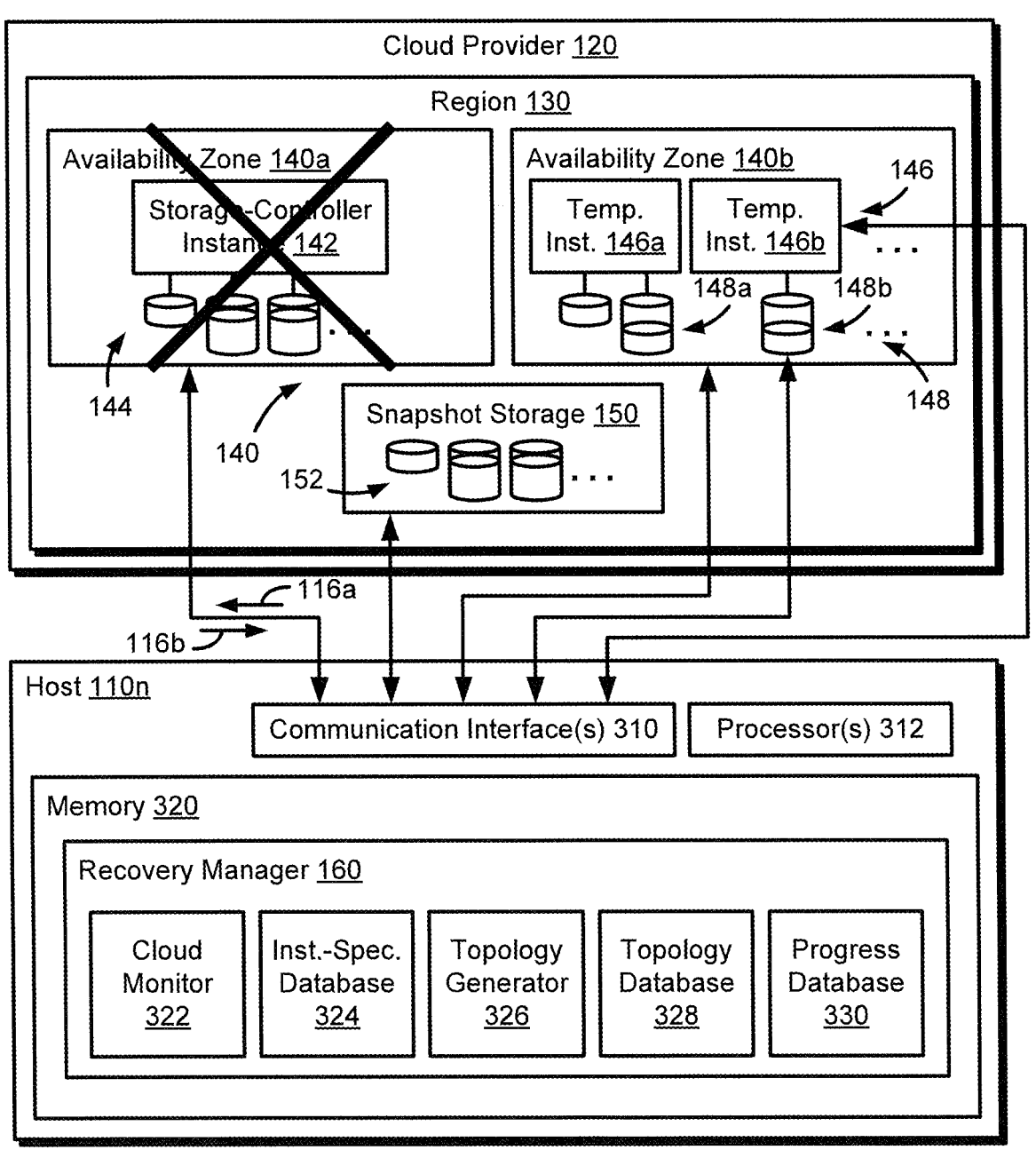
FIG. 3 is a block diagram showing additional features of a recovery manager from the example environment of FIG. 1.

FIG. 3 shows additional features of the recovery manager 160 running on host 110n. As shown, the host 110n includes one or more communication interfaces 310, a set of processors 312, and memory 320. The communication interfaces 122 include, for example, network interface adapters for converting electronic and/or optical signals received over the network 114 (FIG. 1) to electronic form. The set of processors 312 includes one or more processing chips and/or assemblies, such as numerous multi-core CPUs (central processing units). The memory 320 includes both volatile memory, e.g., RAM (Random Access Memory), and non-volatile memory, such as one or more ROMs (Read-Only Memories), disk drives, solid state drives, and the like. The set of processors 312 and the memory 320 together form control circuitry, which is constructed and arranged to carry out various methods and functions as described herein. Also, the memory 320 includes a variety of software constructs realized in the form of executable instructions. When the executable instructions are run by the set of processors 312, the set of processors 312 is made to carry out the operations of the software constructs. Although certain software constructs are specifically shown and described, it is understood that the memory 320 typically includes many other software components, which are not shown, such as an operating system, various applications, processes, and daemons.

As further shown in FIG. 3, the memory 320 "includes," i.e., realizes by execution of software instructions, the recovery manager 160. The recovery manager 160 has a cloud monitor 322, an instance-specification database 324, a topology generator 326, a topology database 328, and a progress database 330.

The cloud monitor 322 is constructed and arranged to monitor a status of one or more of the AZs 140 and the snapshot storage facility 150. To this end, the cloud monitor 322 is constructed and arranged to transmit the queries 116a to the cloud provider 120 and to receive the responses 116b from the cloud provider 120. For example, in some embodiments, the cloud monitor 322 is constructed and arranged to periodically query whether an AZ is functioning and to query the snapshot storage facility 150 to track the snapshots 152, e.g., to determine corresponding local volumes to be created during recovery.

The instance-specification database 324 is constructed and arranged to store characteristics of one or more types of instances available to be created in an AZ, e.g., the AZ 140b. In some embodiments, the characteristics include hardware capabilities (e.g., RAM, throughput), time-varying characteristics, and so forth.

The topology generator 326 is constructed and arranged to identify candidate combinations of instances (topologies). In some embodiments, the topology generator 326 is constructed and arranged to access characteristics of instance types from the instance-specification database 324 and to disqualify (filter out) instance types with insufficient capabilities, e.g., maximum allowable throughput, RAM, and so forth. In some embodiments, the topology generator 326 is further constructed and arranged to form combinations of instances from the instance types and to disqualify (filter out) combinations with insufficient characteristics, e.g., number of instances, overall throughput of constituent instances, and so forth. The topology generator 326 is further constructed and arranged to store one or more candidate combinations of instances in the topology database 328.

The progress database 330 is constructed and arranged to track progress of a recovery operation. Along these lines, in some embodiments, the progress database 330 is constructed and arranged to periodically receive and store progress metadata from the cloud provider indicating the progress of the recovery operation. In some embodiments, the progress metadata identifies a volume offset of a particular snapshot volume.

In example operation, the recovery manager 160 directs recovery of data from snapshots 152 following a failure of the AZ 140a. Along these lines, the cloud monitor 322 detects the failure of the AZ 140a. In some embodiments, the cloud monitor 322 periodically pings the AZ 140a and detects a failure, e.g., if the AZ 140a does not respond within a predefined amount of time.

In response to the failure, the recovery manager 160 identifies temporary instances to be used for recovery and directs the cloud provider 120 to create the temporary instances 146, as well as to provision the local volumes 148 in the AZ 140*b*.

Preferably, the recovery manager 160 selects the plurality of temporary instances 146 prior to an AZ failure occurring and from multiple candidate combinations of instances available in the AZ 140*b*. Along these lines, the cloud monitor 322 queries the cloud provider 120 to identify the characteristics of the types of instances available in the AZ 140*b*, e.g., using an API (application programming interface) call. In some embodiments, the cloud monitor 322 stores the characteristics in the instance-specification database 324.

Further, the topology generator 326 accesses the characteristics from the instance-specification database 324 and identifies one or more candidate combinations of instances available to be created in the AZ 140*b*. To this end, the topology generator 326 identifies suitable instance types based on the characteristics and forms combinations of instances from the suitable instance types. The topology generator 326 further selects a candidate combination to use as the plurality of temporary instances for recovery. In some embodiments, the topology generator 326 selects the candidate combination based on one or more predefined criteria, e.g., hardware capabilities, time-varying characteristics, and so forth.

In some embodiments, the topology generator 326 stores a list of one or more of the candidate combinations in the topology database 328. In a preferred embodiment, the list provides multiple candidate combinations to enable the recovery manager 160 to fall back on a substitute candidate combination in case an initially selected candidate combination is not immediately available at the time of recovery. However, in an alternative embodiment, the topology generator 326 stores only the most-suitable candidate combination, e.g., to save storage space.

In some embodiments, the recovery manager 160 reidentifies candidate combinations at a predefined interval or in response to a predefined trigger, e.g., once a day, upon detecting a failure of a separate AZ, and so forth.

In some embodiments, upon detecting a failure of the AZ 140*a* and after selecting the plurality of temporary instances 146 to recover data, the recovery manager 160 determines whether the plurality of temporary instances 146 is immediately available. In response to an AZ failure, multiple customers may overload another AZ by instantiating a high number of instances simultaneously, resulting in one or more instance types becoming unavailable at the time of recovery.

In further example operation, the recovery manager 160 directs the cloud provider 120 to attach the local volumes 148 to the temporary instances 146, e.g., to attach the local volumes 148*a* to the temporary instance 146*a*, to attach the local volumes 148*b* to the temporary instance 146*b*, and so forth. The recovery manager 160 further directs the temporary instances 146 to copy respective portions of recovery data from the snapshots 152 into the local volumes 148.

In further example operation, the recovery manager 160 tracks a progress of a recovery operation. Along these lines, the recovery manager 160 directs the cloud provider 120 to periodically send progress metadata that the recovery manager 160 stores in the progress database 330. Such progress metadata enables the recovery manager 160 to continue the recovery operation in the event that a temporary instance becomes unavailable or a better-suited instance becomes available. For example, when a temporary instance becomes unavailable, the recovery manager 160 directs the cloud provider 120 to attach local volumes to a separate, available temporary instance. Using the progress metadata, the available temporary instance continues the recovery operation from where the unavailable temporary instance left off.

Once copying of recovery data is complete, the recovery manager 160 directs the cloud provider 120 to detach the local volumes 148 from the temporary instances 146. The recovery manager 160 further directs the cloud provider 120 to create the storage-controller instance 242 (if not created already), to attach the local volumes 148 to the storage-controller instance 242, and to terminate the temporary instances 146. In this manner, regular storage operations may resume in the AZ 140*b* using the storage-controller instance 242.

In some embodiments, the recovery operation is fully transparent to other storage operations, e.g., storage operations that service the I/O requests 112 from the hosts 110. That is, the recovery manager 160 may recover data to volumes without implementation details of a system that later accesses the volumes. As a result, the recovery manager 160 may be implemented to support systems that do not have integrated recovery capabilities, allowing the systems to simply boot as usual when the volumes are fully initialized.

Further, in some embodiments, the recovery manager 160 is system agnostic. That is, the recovery manager 160 may support a wide variety of data storage implementations, such as storage systems, databases, and so forth.

Figure 4:
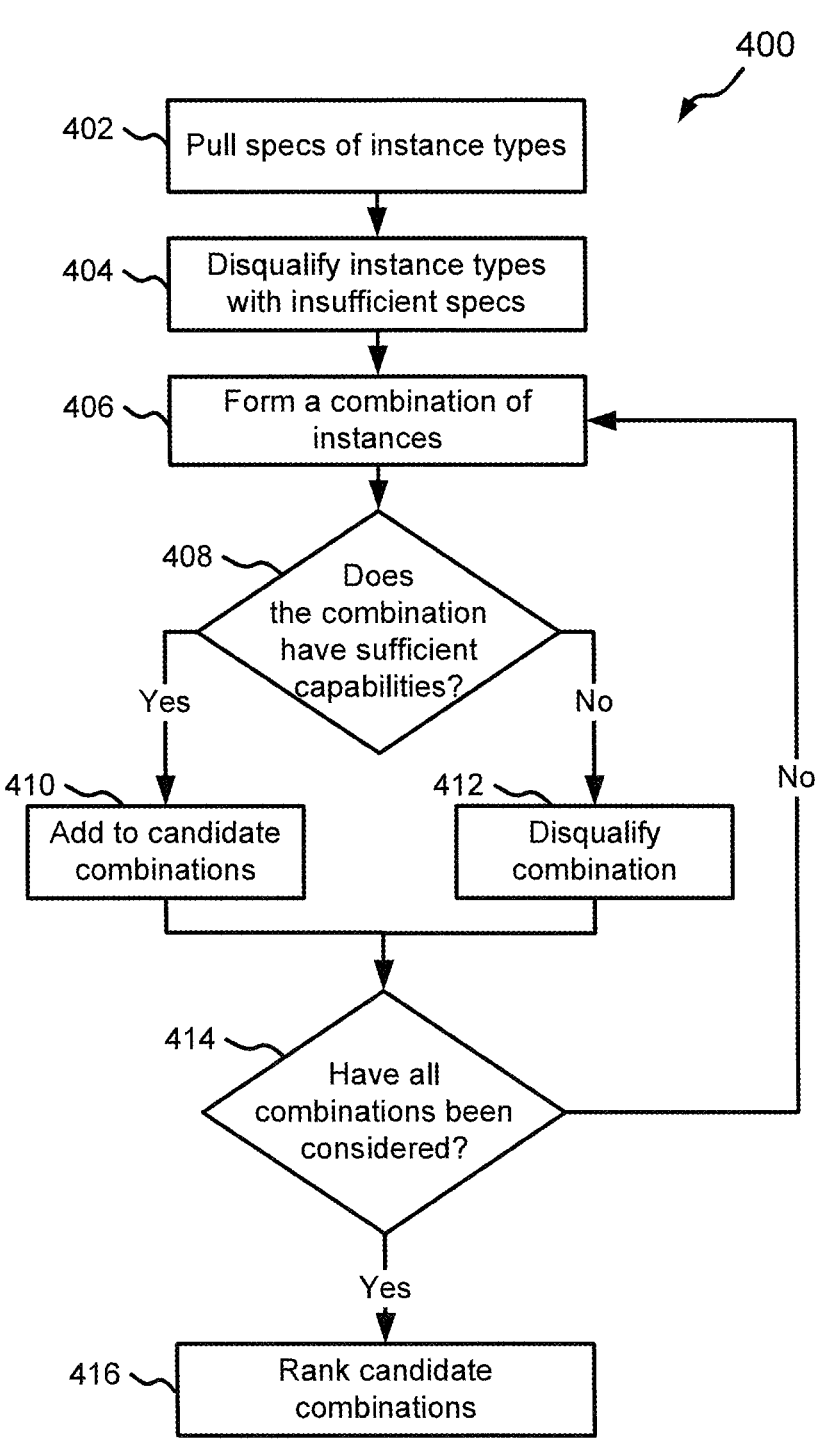
FIG. 4 is a flowchart showing an example method of identifying candidate combinations of instances available in an AZ.

FIG. 4 shows a flowchart of a method 400 in which the recovery manager 160 identifies and selects candidate combinations of instances to recover data following a failure of an AZ.

At 402, the cloud monitor 322 obtains characteristics of multiple instance types available in the AZ 140*b*. In some embodiments, the cloud monitor 322 stores the characteristics in the instance-specification database 324.

At 404, the topology generator 326 accesses the instance-specification database 324 and disqualifies (filters out) types of instances that fail to meet one or more predefined criteria. Non-limiting example criteria include available RAM, allowable throughput, and so forth. In some embodiments, the one or more criteria for disqualifying instance types are relative to the local volumes to be written to in the recovery operation. For example, in some embodiments, the local volumes 148 have initial-access throughputs. The topology generator 326 can disqualify an instance type that has a maximum throughput that is less than a maximum initial-access throughput of one of the local volumes 148. In this manner, the topology generator 326 can ensure that the remaining (non-disqualified) instance types have at least enough throughput to meet the maximum throughput of a local volume when performing an initial copy of recovery data to the local volume. In another example, the topology generator 326 disqualifies an instance type that has insufficient memory, e.g., RAM, to perform a full read of a snapshot into a local volume.

At 406, the topology generator 326 forms a combination of instances from available instances in the AZ 140*b*. In a preferred embodiment, the topology generator 326 considers only uniform combinations of single types of instances, i.e., combinations having only one instance type and common specifications. However, in other embodiments, the topology generator 326 considers non-uniform combinations that have multiple types of instances.

At 408, the topology generator 326 checks whether the combination has sufficient capabilities for the recovery operation. If the combination has sufficient capabilities, the method 400 proceeds to 410 in which the combination is added to a set of candidate combinations. However, if the combination does not have sufficient capabilities, the method 400 proceeds to 412 in which the combination is disqualified from consideration.

When checking the capabilities of the combination, the topology generator 326 checks the hardware capabilities of the combination. For example, in some embodiments, the topology generator 326 disqualifies a combination if a sum of maximum allowable throughputs of instances in the combination is less than a sum of estimated initial-access throughputs of the plurality of local volumes 148. In this manner, the topology generator 326 ensures that the combination has at least enough throughput to meet the maximum throughput of the local volumes 148 during the recovery operation.

Further, when checking the capabilities of the combination, the topology generator 326 checks the number of instances in the combination and disqualifies the combination if the plurality of local volumes 148 cannot be evenly distributed among the number of instances in the combination. For example, suppose the plurality of local volumes 148 includes 20 volumes. In this case, the topology generator 326 considers only combinations that have 1, 2, 4, 5, or 10 instances, as the 20 volumes are evenly distributable among these numbers of instances. In this manner, the recovery operation may distribute work approximately evenly across the temporary instances, allowing the temporary instances to complete respective portions of the full read around the same time. In some embodiments, the topology generator 326 considers only certain local volumes as part of the plurality of local volumes 148, while ignoring one or more volumes of negligible size. For example, some of the volumes can be small, such as a volume storing an operating system, and such small volumes are typically not counted among the volumes to be evenly distributed.

At 414, the topology generator 326 checks whether all possible combinations have been considered. In some embodiments, the total number of combinations is limited by a total number of the local volumes 148. That is, in some embodiments, the topology generator 326 considers only combinations having respective numbers of instances less than or equal to the total number of the local volumes 148, typically resulting in a majority of combinations having fewer instances than the total number of local volumes 148. If the topology generator 326 has not considered all combinations, then the method 400 returns to 406 in which the topology generator 326 forms a new combination to consider. If the topology generator 326 has considered all combinations, then the method proceeds to 416.

At 416, the topology generator 326 ranks the candidate (non-disqualified) combinations based on one or more criteria, e.g., hardware capabilities, time-varying characteristics, and so forth. In some embodiments, the topology generator 326 stores a list of one or more of the candidate combinations in the topology database 328, with the list preferably having multiple candidate combinations in case the most-suitable combination is unavailable at the time of recovery. In this manner, the recovery manager 160 identifies the best candidate combinations of instances to use as temporary instances when recovering data. However, in an alternative embodiment, the topology generator 326 maintains only a most-suitable candidate combination in an iteration of steps 408 through 414 and merely discards less-suitable candidate combinations. In this manner, the topology generator 326 identifies the most-suitable candidate combination without needing to rank the candidate combinations at step 416.

In some embodiments, the recovery manager 160 performs the method 400 at a predefined interval, e.g., once a day. In this manner, the recovery manager 160 regularly reidentifies candidate combinations and updates the list of the candidate combinations.

Figure 5:
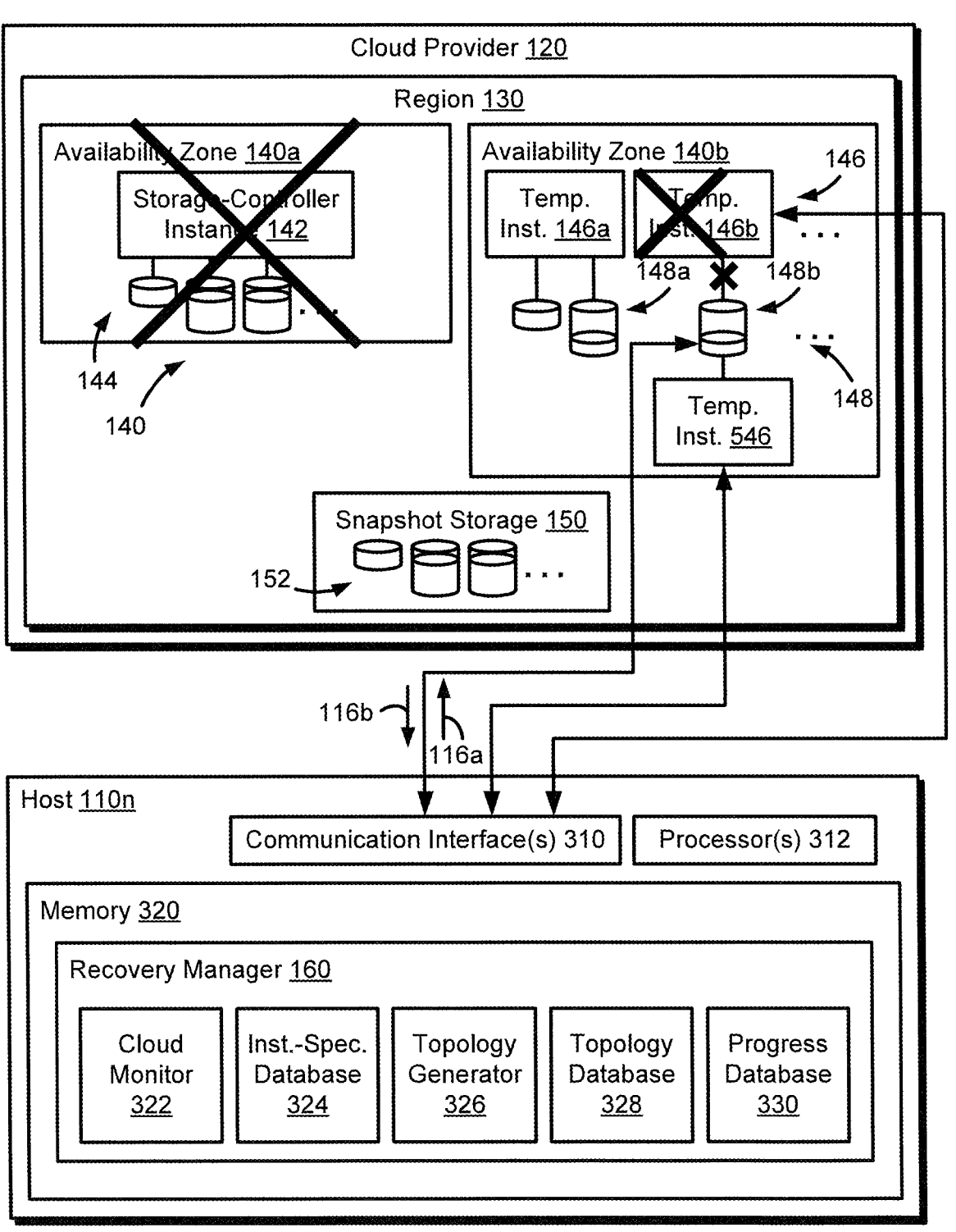
FIG. 5 is a block diagram showing additional features of the example environment of FIG. 1 when a temporary instance becomes unavailable.

FIG. 5 shows additional features of the example environment 100 when a temporary instance 146b becomes unavailable during a recovery operation. Along these lines, in response to detecting that the temporary instance 146b is unavailable, the recovery manager 160 is constructed and arranged to direct the cloud provider 120 to create a new temporary instance 546 in the AZ 140b. Once new temporary instance 546 is created, the recovery manager 160 is constructed and arranged to direct the new temporary instance 546 to copy recovery data in place of the unavailable temporary instance 146b.

The recovery manager 160 is constructed and arranged to identify the recovery data to copy to the plurality of local volumes 148. For example, in some embodiments, the recovery manager 160 is constructed and arranged to provide initial offset values of the snapshots 152 indicating starting positions for a sequential read of the recovery data from the snapshots 152. The initial offset values may be, e.g., zero, indicating a full read starting from beginnings of the snapshots 152.

Further, the recovery manager 160 is constructed and arranged to direct the cloud provider 120 to send progress metadata indicating a progress of the recovery operation. The recovery manager 160 is further constructed and arranged to store the progress metadata in the progress database 330. In some embodiments, the progress metadata includes current offset values of the snapshots 152 indicating a progress of the sequential read.

Still further, the recovery manager 160 is constructed and arranged to detect an unavailability of one or more of the temporary instances 146. For example, in some embodiments, the recovery manager 160 is constructed and arranged to detect that the temporary instance 146b in unavailable if the cloud provider 120 fails to provide progress metadata of the temporary instance 146b within a predefined amount of time. In another example, the recovery manager 160 is constructed and arranged to detect that the temporary instance 146b is unavailable by receiving a termination notice from the cloud provider 120. The termination notice may indicate a present or future unavailability, e.g., a crash report, a "take back" notification, and so forth. It should be appreciated that some instances may be "spot instances" that the cloud provider 120 can terminate with little prior notice, e.g., two minutes.

In example operation, the recovery manager 160 directs the cloud manager 120 to read recovery data from the snapshots 152 sequentially from respective initial offset valves, e.g., sequentially from a zero offset. Further, the recovery manager 160 periodically receives current offset values of the sequential read and stores the current offset values in the progress database 330.

In further example operation, the recovery manager 160 detects an unavailability of the temporary instance 146b that was previously copying recovery data from a snapshot to the local volume 148b. In response, the recovery manager 160 accesses the progress database 330 to identify, for the snapshot corresponding to the local volume 148b, a most-recent offset reported by the cloud manager 120. Further, the recovery manager 160 directs the cloud manager 120 to create the temporary instance 546 in the AZ 140*b* and to attach the local volume 148*b* to the temporary instance 546. The recovery manager 160 further directs the cloud manager 120 to continue copying the recovery data to the local volume 148*b* using the new temporary instance 546, starting from the identified offset. In this manner, the new temporary instance 546 copies a remaining portion of recovery data originally assigned to the unavailable temporary instance 146*b*, without needing restart from the beginning of the corresponding snapshot.

A similar operation may be performed if a better-suited instance becomes available during recovery. For example, the cloud provider 120 may provide a spot instance that was not originally available when recovery began. In this case, the recovery manager 160 may direct the cloud manager 120 to replace an existing temporary instance with the new temporary instance, even if the replaced temporary instance is still available.

FIG. 6 shows an example method 600 that may be carried out in connection with the example environment 100. The method 600 is typically performed, for example, by the software constructs described in connection with FIG. 3, which reside in the memory 320 of the recovery manager 160 and are run by the set of processors 312. The various acts of method 600 may be ordered in any suitable way. Accordingly, embodiments may be constructed in which acts are performed in orders different from that illustrated, which may include performing some acts simultaneously.

At 602, following a failure of a first AZ 140*a* of a cloud-based system, the recovery manager 160 directs the cloud provider 120 to create a plurality of temporary instances 146 in a second AZ 140*b* of the cloud-based system.

At 604, the recovery manager 160 directs the cloud provider 120 to copy, by the plurality of temporary instances 146, recovery data from multiple cloud-based snapshots 152 to a plurality of local volumes 148 of the second AZ 140*b* such that the temporary instances of the plurality of temporary instances 146 copy respective portions of the recovery data in parallel.

At 606, the recovery manager 160 directs the cloud provider 120 to attach the plurality of local volumes 148 to a storage-controller instance running in the second AZ 140*b*. In this manner, normal storage operations may resume using the storage-controller instance.

Having described certain embodiments, numerous alternative embodiments or variations can be made. For example, the recovery manager 160 may run on devices other than the host 110*n*, e.g., in the cloud.

Also, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of recovering data following a failure of a first availability zone (AZ) of a cloud-based system, comprising:

creating a plurality of temporary instances in a second AZ of the cloud-based system;

copying, by the plurality of temporary instances, recovery data from multiple cloud-based snapshots to a plurality of local volumes of the second AZ such that the temporary instances of the plurality of temporary instances copy respective portions of the recovery data in parallel; and attaching the plurality of local volumes to a storage-controller instance running in the second AZ;

wherein copying the recovery data includes directing the temporary instances to simultaneously write the respective portions of the recovery data from the cloud-based snapshots to the plurality of local volumes.

2. The method of claim 1, further comprising, prior to creating a plurality of temporary instances:

identifying multiple candidate combinations of instances that are available in the second AZ, one of the identified candidate combinations being the plurality of temporary instances; and selecting, from the candidate combinations, the plurality of temporary instances as a selected combination.

3. The method of claim 2, wherein selecting the plurality of temporary instances is based at least in part on a set of hardware capabilities of the temporary instances in the selected combination.

4. The method of claim 3, wherein identifying the candidate combinations includes disqualifying a particular combination of instances from the candidate combinations based on a sum of maximum allowable throughputs of instances in the particular combination being less than a sum of estimated maximum initial-access throughputs of the plurality of local volumes.

5. The method of claim 3, wherein identifying the candidate combinations includes disqualifying an instance type based on the instance type providing insufficient memory to copy a portion of recovery data from a snapshot of the multiple cloud-based snapshots into a local volume of the plurality of local volumes.

6. The method of claim 3, wherein identifying the candidate combinations includes disqualifying a particular instance type based on the particular instance type having a maximum throughput less than an estimated maximum throughput of one of the plurality of local volumes on an initial access.

7. The method of claim 3, wherein identifying the candidate combinations includes disqualifying a particular combination of instances from the candidate combinations based on the particular combination having a respective number of instances in which the plurality of local volumes is not evenly distributable.

8. The method of claim 2, wherein identifying the candidate combinations includes providing, as the candidate combinations, only uniform combinations of single types of instances.

9. The method of claim 2, further comprising:

after selecting the plurality of temporary instances, confirming that the plurality of temporary instances is immediately available.

10. The method of claim 2, further comprising:

storing a list of the candidate combinations outside of the first AZ prior to the failure occurring in the first AZ; and reidentifying the candidate combinations at a predetermined interval to update the list of the candidate combinations.

11. The method of claim 1, further comprising:

provisioning the storage-controller instance with a lower maximum allowable throughput than a sum of maximum allowable throughputs of the plurality of temporary instances.

12. The method of claim 1, further comprising:

estimating a maximum initial-access throughput of a local volume of the plurality of local volumes, the estimated maximum initial-access throughput indicating an estimated maximum throughput of the local volume when the local volume is first brought online; and prior to copying recovery data from a cloud-based snapshot to the local volume, provisioning the local volume with a maximum allowable throughput based on the estimated maximum initial-access throughput.

13. The method of claim 12, further comprising:

after copying the recovery data from the snapshot to the local volume, reprovisioning the local volume with a higher maximum allowable throughput.

14. The method of claim 1, further comprising:

while copying the recovery data, detecting an unavailability of a temporary instance of the plurality of temporary instances, one or more local volumes of the plurality of local volumes attached to the temporary instance;

in response to detecting the unavailability of a temporary instance, attaching the one or more local volumes to another temporary instance in the second AZ; and copying, by the other temporary instance, a remaining portion of the recovery data to the one or more local volumes.

15. The method of claim 14, further comprising:

prior to detecting the unavailability of the temporary instance, generating progress metadata that tracks a progress of copying the recovery data by the temporary instance; and wherein copying, by the other temporary instance, the remaining portion of the recovery data includes:

accessing the progress metadata to identify the remaining portion of the recovery data to copy.

16. The method of claim 1, wherein creating the plurality of temporary instances includes:

directing a cloud service provider to provision, as the plurality of temporary instances, multiple virtual compute instances having respective sets of allocated computational resources, the multiple virtual compute instances being constructed and arranged to write the respective portions of the recovery data from the cloud-based snapshots to the plurality of local volumes simultaneously with each other.

17. The method of claim 1, wherein the plurality of local volumes includes multiple subsets of local volumes corresponding to the respective portions of the recovery data, the subsets of local volumes being respectively attached to the temporary instances to copy the respective portions of the recovery data in parallel;

wherein attaching the plurality of local volumes to the storage-controller instance includes attaching the subsets of local volumes from the temporary instances to the storage-controller instance, thereby providing data access to each of the subsets of local volumes through the storage-controller instance.

18. A computerized apparatus, comprising control circuitry that includes a set of processors coupled to memory, the control circuitry constructed and arranged to perform a method of recovering data following a failure of a first availability zone (AZ) of a cloud-based system, the method including:

creating a plurality of temporary instances in a second AZ of the cloud-based system;

copying, by the plurality of temporary instances, recovery data from multiple cloud-based snapshots to a plurality of local volumes of the second AZ such that the temporary instances of the plurality of temporary instances copy respective portions of the recovery data in parallel; and attaching the plurality of local volumes to a storage-controller instance running in the second AZ;

wherein copying the recovery data includes directing the temporary instances to simultaneously write the respective portions of the recovery data from the cloud-based snapshots to the plurality of local volumes.

19. A computer program product including a set of non-transitory, computer-readable media having instructions which, when executed by control circuitry of a computerized apparatus, cause the computerized apparatus to perform a method of recovering data following a failure of a first availability zone (AZ) of a cloud-based system, the method including:

creating a plurality of temporary instances in a second AZ of the cloud-based system;

copying, by the plurality of temporary instances, recovery data from multiple cloud-based snapshots to a plurality of local volumes of the second AZ such that the temporary instances of the plurality of temporary instances copy respective portions of the recovery data in parallel; and attaching the plurality of local volumes to a storage-controller instance running in the second AZ;

wherein copying the recovery data includes directing the temporary instances to simultaneously write the respective portions of the recovery data from the cloud-based snapshots to the plurality of local volumes.

20. The computer program product of claim 19, wherein the method further includes, prior to creating a plurality of temporary instances:

identifying multiple candidate combinations of instances that are available in the second AZ, one of the identified candidate combinations being the plurality of temporary instances; and selecting, from the candidate combinations, the plurality of temporary instances as a selected combination.

\* \* \* \* \*